E. RICHARDSON.
REFRIGERATOR LINING.
APPLICATION FILED NOV. 19, 1910.

997,210.

Patented July 4, 1911.
4 SHEETS—SHEET 1.

WITNESSES

INVENTOR
Ernest Richardson
by F. N. Barker
attorney

E. RICHARDSON.
REFRIGERATOR LINING.
APPLICATION FILED NOV. 19, 1910.

997,210.

Patented July 4, 1911.

4 SHEETS—SHEET 2.

E. RICHARDSON.
REFRIGERATOR LINING.
APPLICATION FILED NOV. 19, 1910.
997,210.
Patented July 4, 1911.
4 SHEETS—SHEET 3.
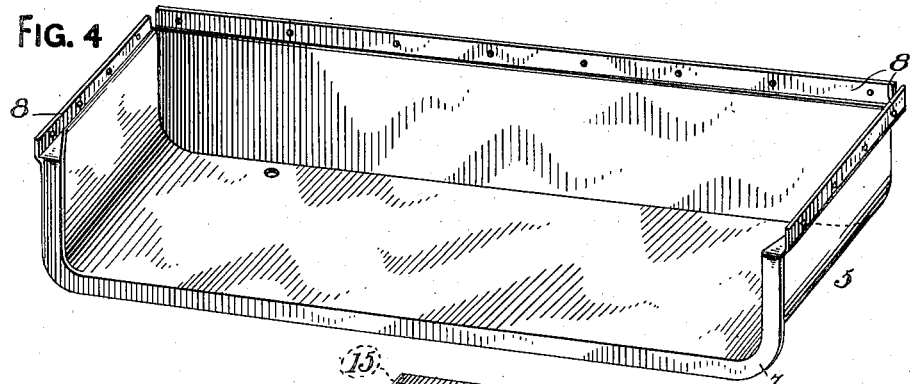
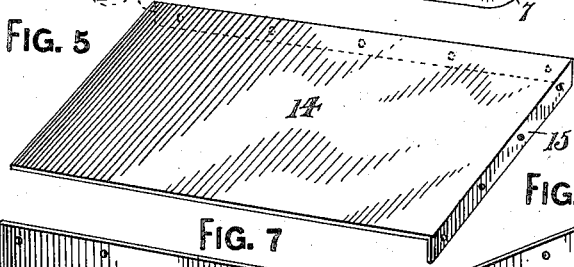
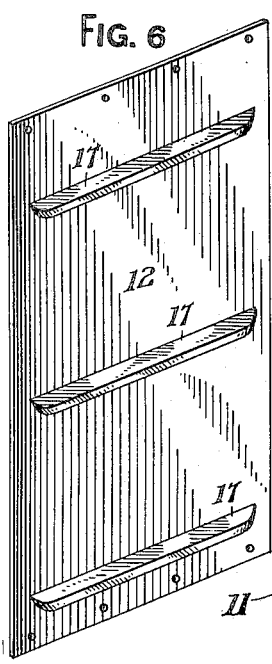
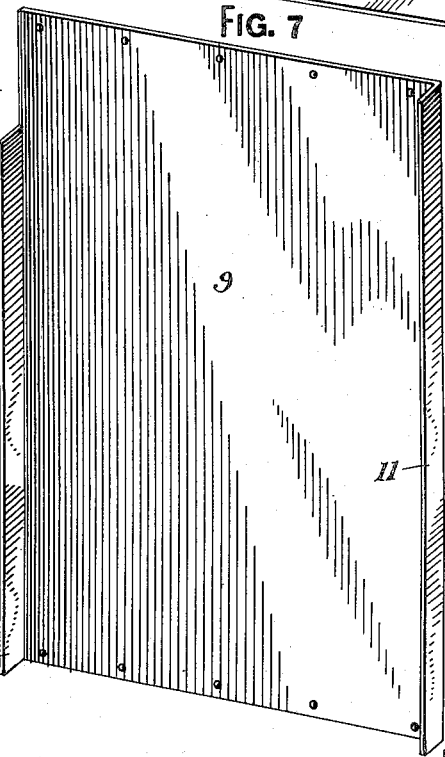
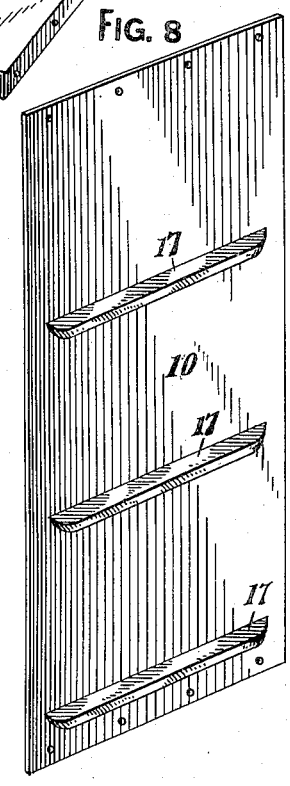
WITNESSES
INVENTOR

E. RICHARDSON.
REFRIGERATOR LINING.
APPLICATION FILED NOV. 19, 1910.

997,210.

Patented July 4, 1911.
4 SHEETS—SHEET 4.

WITNESSES
INVENTOR

UNITED STATES PATENT OFFICE.

ERNEST RICHARDSON, OF BEAVER FALLS, PENNSYLVANIA, ASSIGNOR TO INGRAM-RICHARDSON MANUFACTURING COMPANY, OF BEAVER FALLS, PENNSYLVANIA, A CORPORATION OF PENNSYLVANIA.

REFRIGERATOR-LINING.

997,210.        Specification of Letters Patent.        Patented July 4, 1911.

Application filed November 19, 1910. Serial No. 593,186.

*To all whom it may concern:*

Be it known that I, ERNEST RICHARDSON, a citizen of the United States, residing at Beaver Falls, in the county of Beaver and State of Pennsylvania, have invented new and useful Improvements in Refrigerator-Linings, of which the following is a specification.

My invention relates to porcelain-enameled sheet-metal linings for refrigerators and its object is to make them in several parts which may be assembled so as to present a finished appearance and which can be manufactured without becoming warped or distorted in the process of burning the enamel on the sheets. Heretofore, the food compartments, both rectangular and L-shaped, have been made in one large piece which has been coated with enamel and then burned in a suitable furnace designed for the purpose. It has been difficult to prevent such large single-piece compartments from warping or sagging during the burning operation. Furthermore, the preparation of the sheet-metal for the enameling process has been attended with considerable trouble owing to the strains put on the metal in the bending and stamping operations. I have largely avoided this difficulty by making the linings of the food-compartment of a number of small simple parts which require but little die-shaping of a comparatively simple nature, accomplished with smaller and cheaper dies than have been used formerly.

Figure 1:
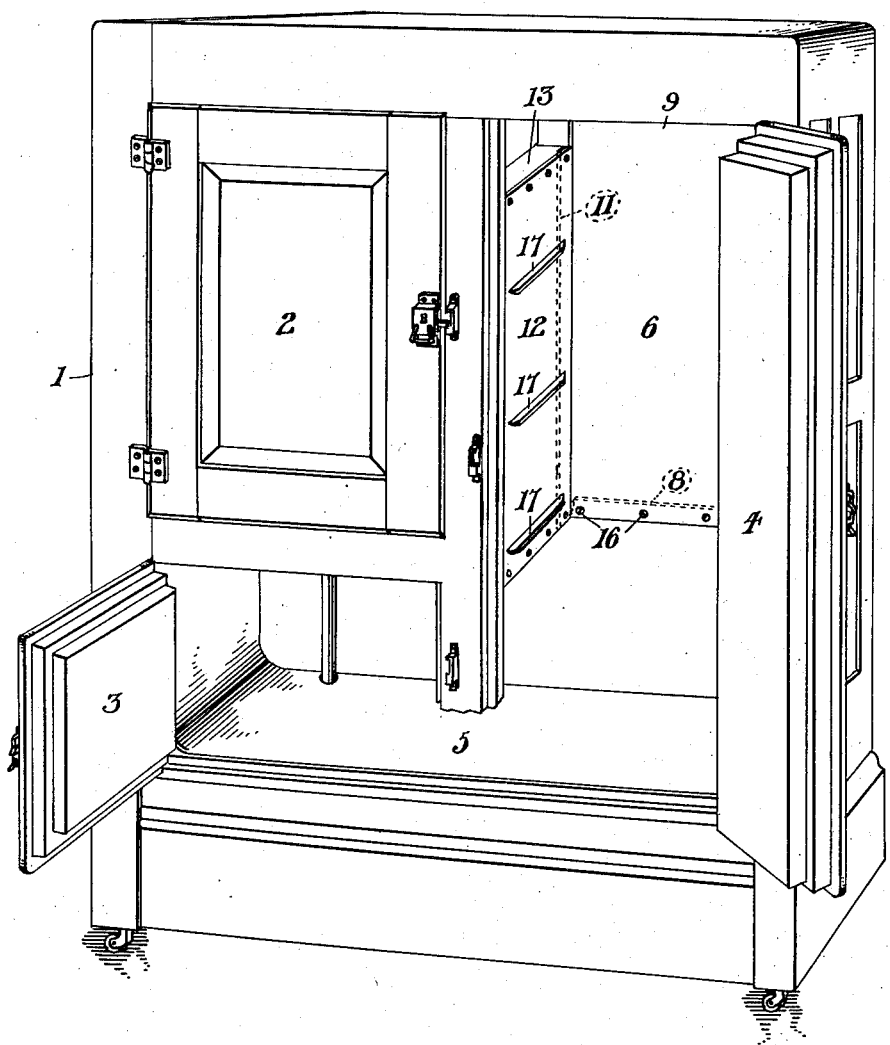
Figure 2:
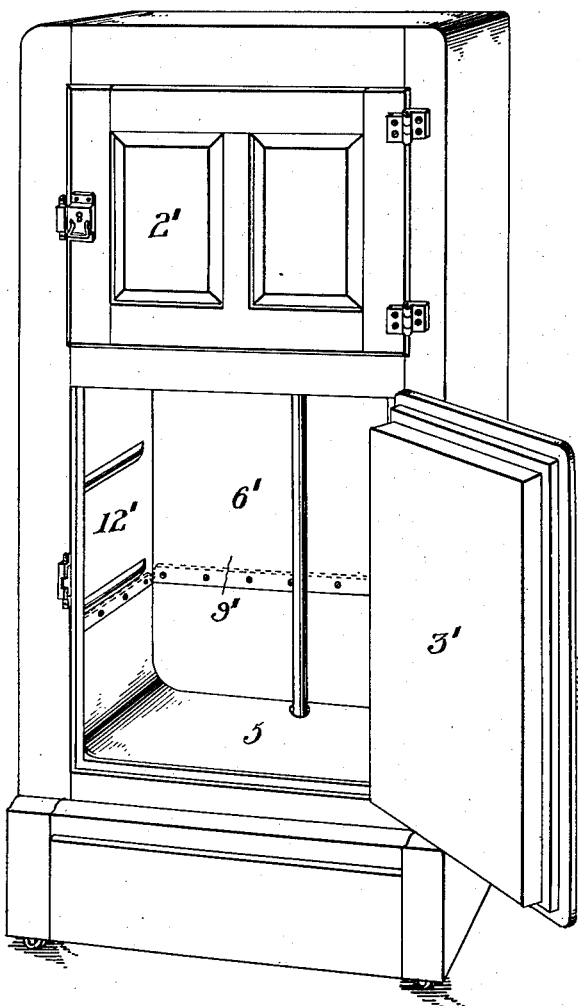
Figure 3:
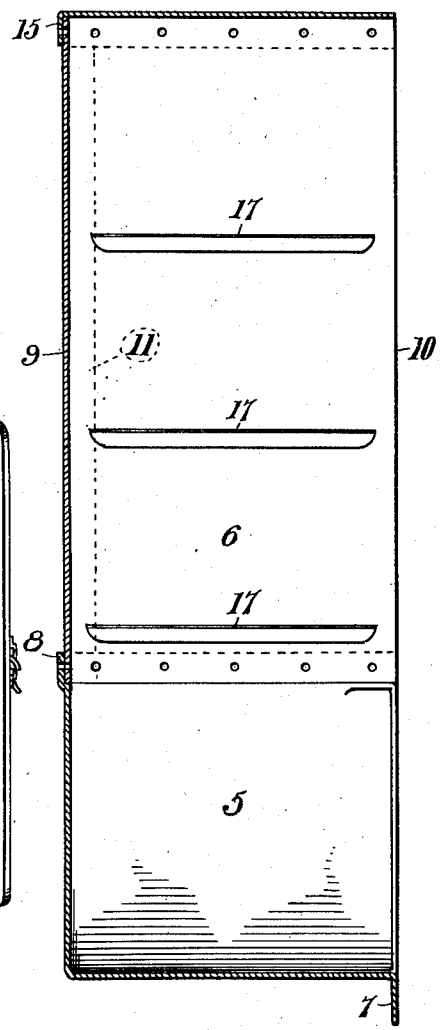
Figure 9:
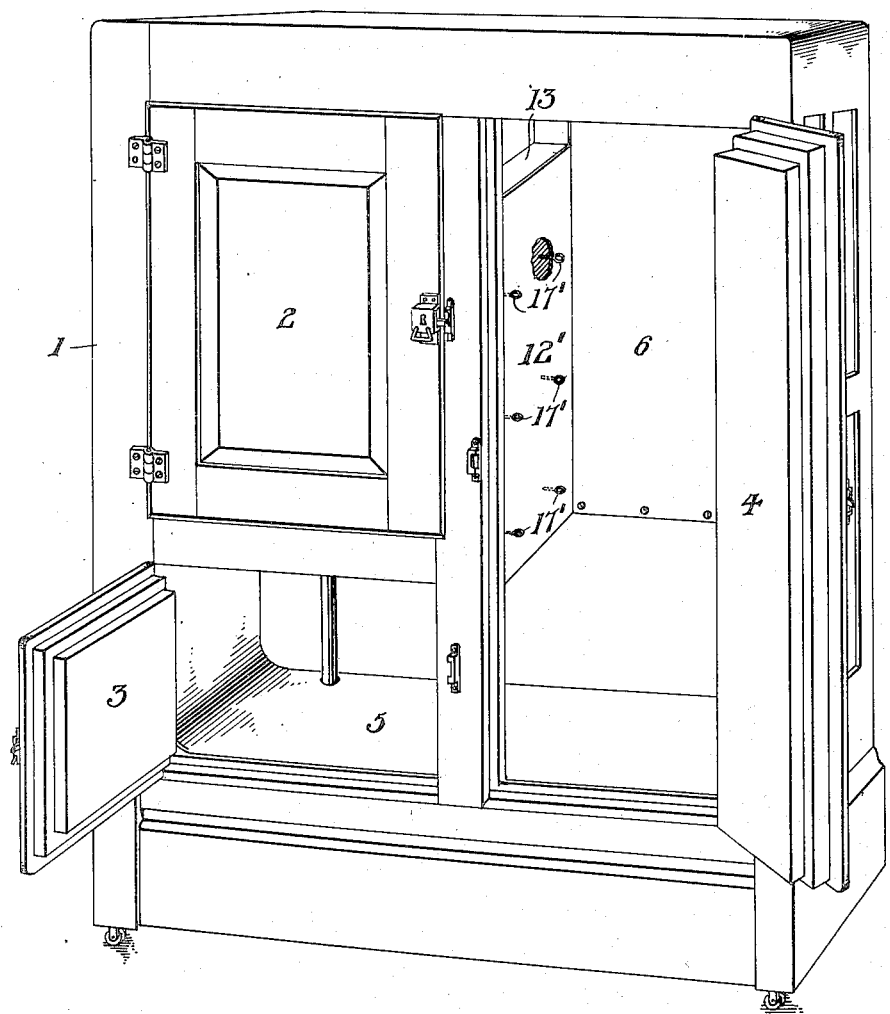
Figure 10:
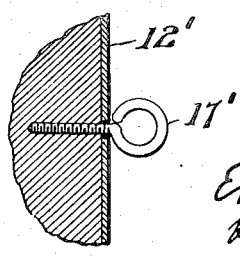

Referring to the accompanying drawings, Figure 1 is a perspective, partly broken away, of a refrigerator embodying one form of my invention; Fig. 2, a perspective showing a different style of refrigerator provided with my invention; Fig. 3, an enlarged vertical section from front to back of such a lining as is shown on the right-hand side of Fig. 1, or as is shown in Fig. 2; Fig. 4, a perspective of the one-piece bottom section of my improved refrigerator lining for the refrigerator shown on Fig. 1; and Figs. 5, 6, 7, and 8 are perspectives of the top, the left-hand side, the back, and the right-hand side plates, respectively, which, when assembled, constitute the upper, or top, section of my improved lining. Fig. 9 is a perspective of a refrigerator showing a modified form of side lining with modified shelf supports. Fig. 10 shows a detail partly in section and partly in elevation.

Referring first to Fig. 1, 1 designates a refrigerator having the door 2 for the ice-compartment (not shown), the door 3 for that portion of the food compartment which lies under the ice-compartment, and the door 4 for that portion of the food compartment which lies at the right-hand side of the ice compartment and of the door 3. The food compartment is the shape of a reverse L, the horizontal part or section 5 being composed of the single piece of enameled sheet metal, while the vertical part or section 6 which lies above the section 5 and at the side of the ice compartment is composed of the enameled parts shown in Figs. 5 to 8. The section 5 is substantially the height of the space in the refrigerator below the ice compartment and has a horizontal bottom, two vertical ends, and a vertical back, made in one piece prior to coating with enamel. It has no top or front. Its front edge along the bottom and ends is stiffened by the vertical flange 7. The top edge of the section 5 is provided with the vertical flange 8 which is off-set outwardly from the vertical walls of the section, so that the top of the said walls form a seat for the top section 6 which has its back 9 and its right-hand end 10 within or in front of the flange 8. The back 9 is provided with vertical flanges 11 at its edges which extend forwardly a short distance along the outer faces of the side linings or plates 10 and 12. The plate 12 is secured to the wall of the ice compartment and has its top stop at the opening 13 which leads to the ice compartment. The flange 11 also stops at the opening 13. The top of the section 6 is lined with the plate 14 having the flanges 15 extending outside the plates 9 and 10. The sections are all connected to the walls of the refrigerator and ice compartment by screws 16 or other fastenings passed through holes in the sections. 17 represents shelf supports consisting of ribs pressed inwardly from the side linings 10 and 12, the ribs not extending to the edges of the linings 10 and 12, whereby their strength is preserved and the use of extra supports for the edges is obviated during the burning of the enamel thereon.

In Fig. 2 the ice compartment is placed wholly above the food compartment and is provided with the door 2'. The food compartment occupies all the space below the ice compartment and is provided with the door 3'. The food compartment has the bottom one-piece section 5 as in Fig. 1, but the upper section 6' has the back plate 9' extending entirely across the back of the compartment, and the end plate 12' which is not shortened like the plate 12.

Thus, I have provided linings for refrigerators which can be readily made without danger of distortion in the burning operation; which require cheaper dies and less power in their manufacture than linings composed of one piece; which are simple, readily assembled, and attractive in appearance; and which will direct any moisture on their inner faces to the bottom of the food compartment without allowing it to get between the lining and the wooden-body of the refrigerator.

In Figs. 9 and 10 I show the side lining 12' without pressed shelf-supports, but in place thereof I show this lining flat with screw eyes 17' passed through openings in the lining and into the body of the refrigerator, as clearly shown in Fig. 10. The screw-eyes form shelf-supports and at the same time they serve to hold the lining in place. Of course, devices not strictly screw-eyes may be used in their place.

I claim—

1. A refrigerator lining composed of a one-piece sheet-metal bottom section with open front and top, and provided with an outwardly off-set vertical flange at the top of its ends and back, in combination a top sheet-metal section composed of back and side plates having openings to secure them to the refrigerator body and resting with their lower ends on the upper edges of the bottom section and within the space included by the said flange.

2. A refrigerator lining composed of a one-piece sheet-metal bottom section with open front and top, and provided with an outwardly off-set vertical flange at the top of its ends and back, in combination a top sheet metal section composed of side plates and a flanged back plate having openings to secure them to the refrigerator body and resting with their lower ends on the upper edges of the bottom section and within the space included by the said flange.

Signed at Beaver Falls, Pa., this 17th day of November, A. D. 1910.

ERNEST RICHARDSON.

Witnesses:
H. B. RICHARDSON,
EARL R. LEYDA.